(12) United States Patent
Mason

(10) Patent No.: US 7,246,450 B1
(45) Date of Patent: Jul. 24, 2007

(54) ELECTRONIC DEVICE FOR MEASURING CONDUCTIVE FASTENERS

(76) Inventor: Earl Mason, 48 Carpenter Ave., Mansfield, MA (US) 02048

( * ) Notice: Subject to any disclaimer, the term of this patent is extended or adjusted under 35 U.S.C. 154(b) by 0 days.

(21) Appl. No.: 11/487,098

(22) Filed: Jul. 17, 2006

(51) Int. Cl.
*G01B 5/00* (2006.01)
(52) U.S. Cl. .................. 33/784; 33/199 R; 33/783
(58) Field of Classification Search .......... 33/783–784, 33/788–789, 792–794, 797–801, 807–808, 33/815, 820, 199 R, 555.1, 555.2, 555.3, 33/706, 679.1
See application file for complete search history.

(56) References Cited

U.S. PATENT DOCUMENTS

| | | | |
|---|---|---|---|
| 4,947,558 A | | 8/1990 | Cummins |
| 5,430,954 A | * | 7/1995 | Best et al. ..................... 33/793 |
| 5,548,903 A | | 8/1996 | Johnson et al. |
| 6,497,051 B1 | * | 12/2002 | Poole et al. .................. 33/784 |
| 6,508,012 B2 | | 1/2003 | Wells, Jr. |
| 6,829,839 B2 | * | 12/2004 | Killough ...................... 33/784 |
| 7,013,763 B2 | * | 3/2006 | Hsien .......................... 81/165 |

\* cited by examiner

*Primary Examiner*—Yaritza Guadalupe-McCall

(57) ABSTRACT

An electronic device includes a housing that has front and side faces. The side face has a linear shape provided with a longitudinal length smaller than a diameter of the front face. Coextensively shaped top and bottom conductive clamps are coupled to the side face and spaced from the front face. The bottom clamp is stationary and the top clamp is linearly displaced along the side face. The clamps form a closed electrical circuit when engaged with the fastener. A controller is coupled to the top clamp so that the top clamp is linearly displaced downwardly and upwardly when the controller is rotated along first and second directions. A mechanism is included for measuring a voltage level when the clamps contact the fastener. The voltage level is proportionally adjusted based upon the size of the fastener such that the voltage level increases when a linear distance between the clamps increases.

15 Claims, 4 Drawing Sheets

US 7,246,450 B1

ELECTRONIC DEVICE FOR MEASURING CONDUCTIVE FASTENERS

CROSS REFERENCE TO RELATED APPLICATIONS

This application claims the benefit of U.S. Provisional Application No. 60/693,992, filed Jun. 27, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to measuring devices and, more particularly, to an electronic device for measuring conductive fasteners.

2. Prior Art

Presently, in order to determine the size of a nut or bolt head, one uses a trial and error method for fitting different size wrenches over the nut or bolt head until one discovers which wrench fits perfectly. Wrenches are heavy and cumbersome, and time and effort is consumed in this trial and error method because one must keep returning to the tool box to find another size wrench until the right size is finally chosen. Sometimes, nuts and bolts are located in tight spaces where a wrench cannot reach with facility, thus creating a greater waste of time and effort as the user attempts to discover the proper wrench size to use. The hand and eye comparison method is also used to measure the size of the threads in a particular bolt. Once again, the common process is to compare (or even count) the size of the threads in an existing bolt with the size of the threads in a replacement bolt until one finds a replacement bolt with the correct dimensions. This is time consuming, clumsy and often inaccurate.

In the past, inventors created several types of measuring devices with an infinite scale to measure the distance across the flats of a head of nuts and bolts. Also, there have been paper, cardboard, plastic or metal templates made with individual measuring elements incorporated for measuring bolt head sizes, bolt diameters, etc. Such features generally include a plurality of apertures of different diameters, appropriately sized for the various diameters of bolts. Various devices are well known in the prior art which deal with measuring apparatuses.

One prior art example shows a hem gauge that has a continuously graduated scale with an elongated slot down the center thereof. A slide with an index is installed within the slot. The device is used by placing the first end of the scale at the origin of the length or distance to be measured, and sliding the index to the appropriate measurement point. The length or distance is then read off the scale point aligned with the index, as with a conventional ruler or measurement scale. This device only provides for the precise determination of the most common sizes of nuts and bolts, and has no provision for an infinitely adjustable or readable scale.

Another prior art example describes a metric gauge that includes a planar body having formed therein a plurality of integral sockets of varying sizes for wrench size, nut size, bolt size and screw length measuring purposes. Each socket is downwardly formed below the hexagonal configuration area in a hollow cylindrical shape of varying diameter to thereby easily measure the diameter of a bolt by inserting the bolt into one socket after another until the correct diameter is gauged. Again, it appears that the design is intended only for the sorting of mixed nuts, bolts and screws into groups of identical sizes. Furthermore, unfortunately, the planar body of this gauge makes use in practical applications difficult as well.

Yet another prior art example describes a wheel bolt circle gauge structurally somewhat resembling a vernier caliper. An elongated scale includes a tapered or conical tip, with a slide body having a single scale-viewing window therein and a tapered or conical tip extending therefrom. The scale and corresponding opposite edges of the single window each include a different scale thereon, with one scale slide and window edge providing a series of numbers corresponding to metric dimensions and the opposite side and edge having a set of numbers for inch dimensions. Unfortunately, the use of a single window to view all of this information results in a need for a separate table on the scale body for the interpretation of the numbers.

Accordingly, a need remains for an electronic device for measuring conductive fasteners in order to overcome the above-noted shortcomings. The present invention satisfies such a need by providing a measuring device that is convenient and easy to use, is durable yet lightweight in design, is versatile in its applications, and provides a user with a convenient means of measuring fasteners. Such a device quickly and easily informs users as to the precise gauge of any fitting or fastener they may encounter, knowing exactly which wrench socket is required to manipulate it.

The device also provides a sure and certain method of determining a fitting's exact size, eliminating time consuming errors by inaccurate tool selection. Such a measuring device is an invaluable commodity that is extremely helpful in areas where visibility is poor and difficult to access. The electronic device for measuring conductive fasteners provides do-it-yourselfers as well as the professional industry with convenience, accuracy and time-saving capabilities for all their mechanical projects.

BRIEF SUMMARY OF THE INVENTION

In view of the foregoing background, it is therefore an object of the present invention to provide an electronic device for measuring conductive fasteners. These and other objects, features, and advantages of the invention are provided by a hand-held electronic device for measuring a size of a conductive fastener.

The hand-held electronic device includes a portable housing that has planar front and side faces. Such a side face has a linear shape provided with a longitudinal length smaller than a diameter of the front face. Top and bottom conductive clamps are directly coupled to the side face and spaced from the front face respectively. Such top and bottom clamps are coextensively shaped. The bottom clamp is stationary and the top clamp is linearly displaced along the side face such that the fastener is effectively intercalated between the top and bottom clamps during measuring operations. Such a bottom clamp is statically disposed at a bottom end of the side face. The top and bottom clamps form a closed electrical circuit when engaged with the fastener.

A controller is operably coupled to the top clamp in such a manner that the top clamp is linearly displaced downwardly and upwardly when the controller is rotated along first and second directions respectively. The controller preferably includes a first rotary dial that is partially exposed to an exterior of the front face. Such a first rotary dial has a linear driven shaft coupled directly thereto and extending parallel to a fulcrum axis of the first rotary dial. A second rotary dial is directly coupled to the driven shaft in such a manner that the second rotary dial effectively rotates along a predetermined path when the first rotary dial is rotated along a corresponding direction. An elongated and linear gear has an outer surface directly attached to the second rotary dial. Such a linear gear further has a top surface directly coupled to the top clamp such that the top clamp is linearly displaced along the side face when the second rotary dial is articulated.

A mechanism is included for measuring a voltage level when the top and bottom clamps contact the fastener. Such a voltage level is proportionally adjusted based upon the size of the fastener such that the voltage level effectively increases when a linear distance between the top and bottom clamps increases. The voltage level measuring mechanism preferably includes a voltmeter for measuring the voltage level between the top and bottom conductive clamps. Such a voltmeter is electrically coupled directly to the top clamp.

The voltage level measuring mechanism may further include a processor. A conversion table is electrically coupled to the processor. Such a conversion table has data stored therein that provides a list of voltage level readings and a corresponding list of fastener sizes associated with the voltage level readings respectively. A memory is electrically coupled directly to the processor and the conversion table. Such a memory includes software instructions that execute a logic algorithm for causing the hand-held electronic device to measure the size of the fastener.

The software instructions include and execute the steps of linearly ramping a first output voltage when a first input voltage is constant, applying a reference voltage to an integrator for a fixed time to ramp up an output voltage of the integrator, and applying an unknown voltage input to the integrator such that the integrator output voltage is caused to ramp back down. Further steps include recording a time period it takes to ramp down the integrator output voltage to zero, and calculating the voltage level by multiplying the reference voltage and the fixed ramp-up time divided by the ramp-down time. The voltage level measuring mechanism may further include a display screen that is located on the front face. Such a display screen provides a digital reading of a size of the fastener.

The device preferably further includes a light source that is disposed along the side face. Such a light source is operably coupled directly to the linear gear. A motion sensor is electrically coupled to the light source and the linear gear. An internal power source is electrically coupled to the light source and the motion sensor respectively. Power is effectively supplied to the light source when the motion sensor detects movement of the linear gear such that the fastener is illuminated during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
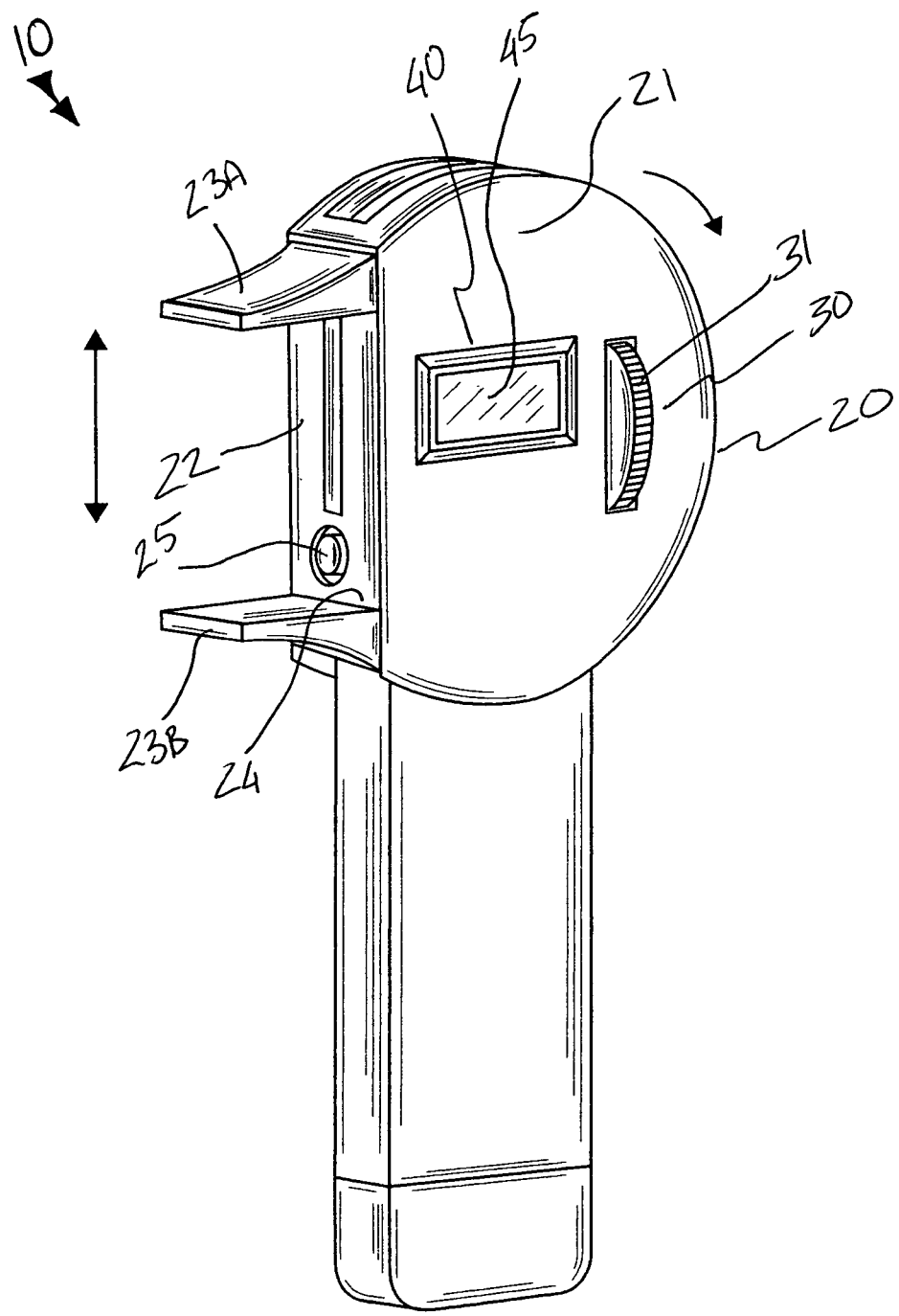
FIG. 1 is a front perspective view showing an electronic device for measuring conductive fasteners, in accordance with the present invention.
Figure 2:
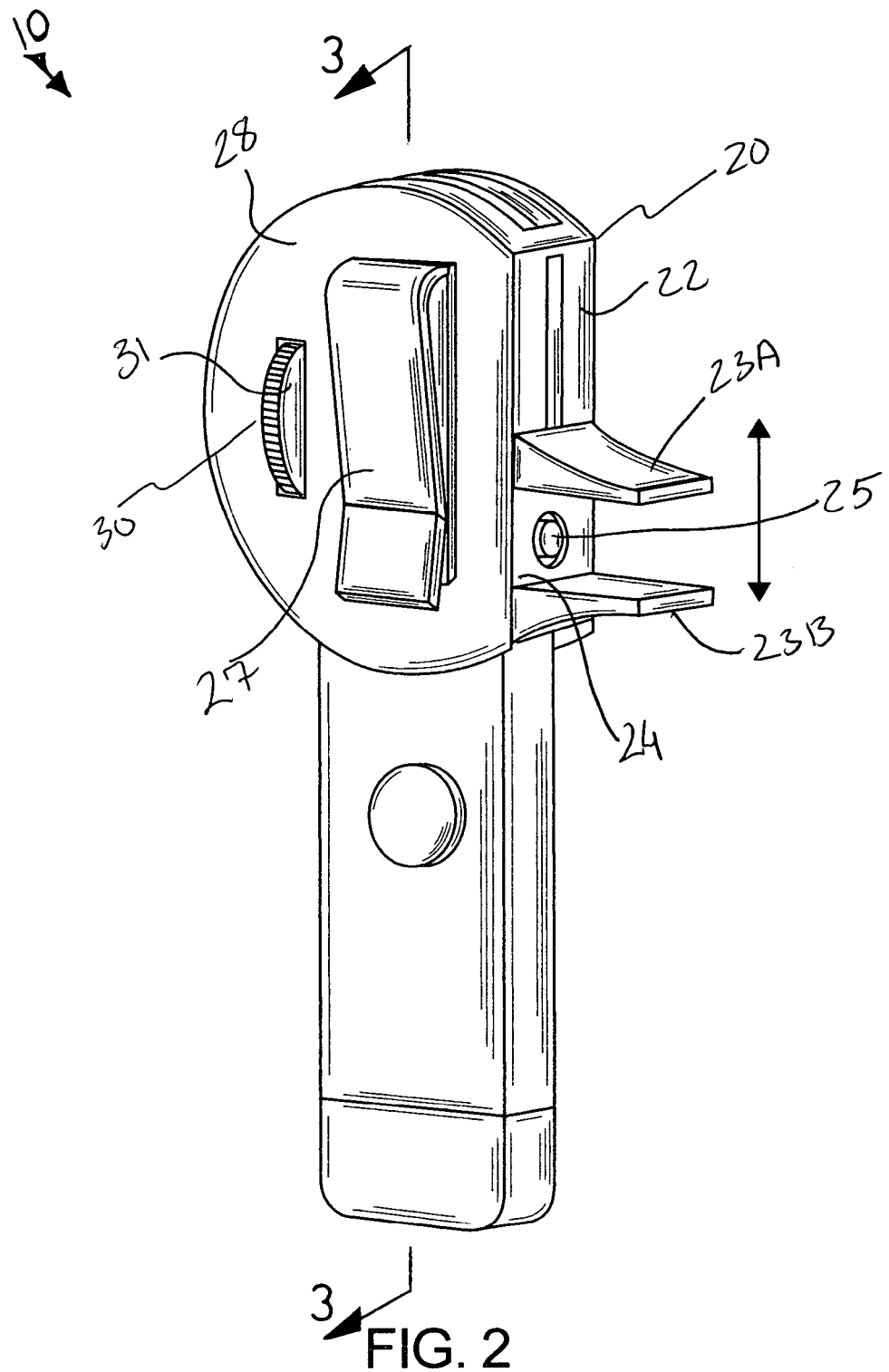
FIG. 2 is a rear perspective view of the device shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-4 by the reference numeral 10 and is intended to provide an electronic device for measuring conductive fasteners. It should be understood that the device 10 may be used to measure many different types of conductive objects and should not be limited in use to only measuring fasteners.

Referring initially to FIGS. 1, 2, 3 and 4, the device 10 includes a portable housing 20 that has planar front 21 and side 22 faces. Such a side face 22 has a linear shape provided with a longitudinal length smaller than a diameter of the front face 21. Top 23A and bottom 23B conductive clamps are directly coupled, without the use of intervening elements, to the side face 22 and are spaced from the front face 21 respectively. Such top 23A and bottom 23B clamps are coextensively shaped. The bottom clamp 23B is stationary and the top clamp 23A is linearly displaced along the side face 22, which is crucial such that a fastener 11 can effectively be intercalated between the top 23A and bottom 23B clamps during measuring operations. Of course, the device 10 may be produced with a variety of maximum distances that can be traveled by the top clamp 23A, depending on the user's measuring needs, as is obvious to a person of ordinary skill in the art. Such a bottom clamp 23B is statically disposed at a bottom end 24 of the side face 22. The top 23A and bottom clamps 23B effectively form a closed electrical circuit when engaged with the fastener 11.

Again referring to FIGS. 1 through 4, a controller 30 is operably coupled to the top clamp 23A in such a manner that the top clamp 23A is linearly displaced downwardly and upwardly when the controller 30 is rotated along first and second directions respectively. The controller 30 includes a first rotary dial 31 that is partially exposed to an exterior of the front face 21, as is best shown in FIG. 1. Such a first rotary dial 31 has a linear driven shaft 32 coupled directly thereto, without the use of intervening elements, that extends parallel to a fulcrum axis of the first rotary dial 31. A second rotary dial 33 is directly coupled, without the use of intervening elements, to the driven shaft 32 in such a manner that the second rotary dial 33 effectively rotates along a predetermined path when the first rotary dial 31 is rotated along a corresponding direction. Use of the rotary dials 31, 33 is vital for enabling the device 10 to measure any type and size of fastener 11 that effectively fits between the top 23A and bottom 23B clamp, unlike conventional devices that are limited to specific types and sizes of fasteners 11. An elongated and linear gear 34 has an outer surface 35 directly attached, without the use of intervening elements, to the second rotary dial 33. Such a linear gear 34 further has a top surface 36 directly coupled, without the use of intervening elements, to the top clamp 23A, which is crucial such that the top clamp 23A is linearly displaced along the side face 22 when the second rotary dial 33 is articulated.

Figure 3:
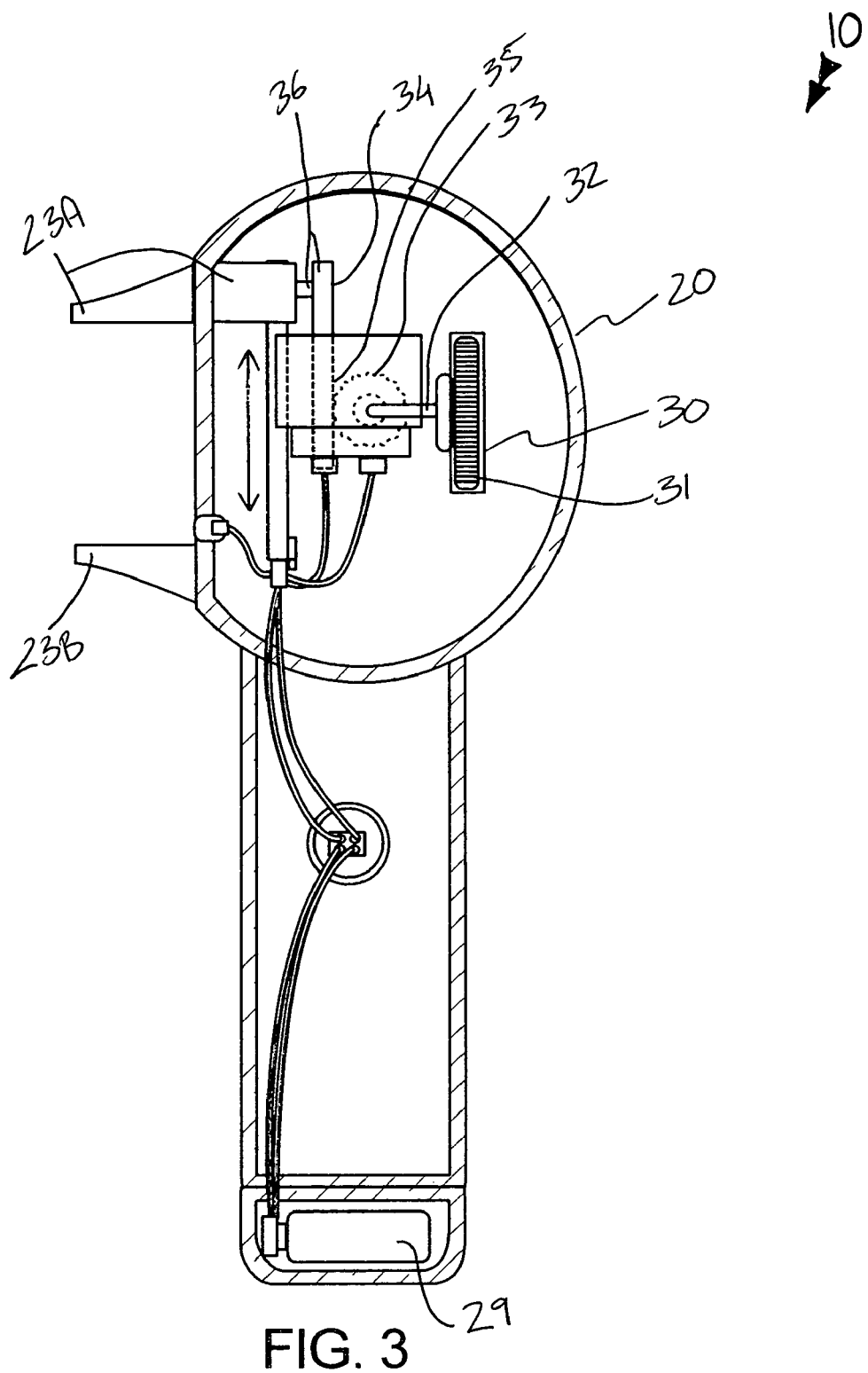
FIG. 3 is a cross-sectional view of the device shown in FIG. 2, taken along line 3-3.
Figure 4:
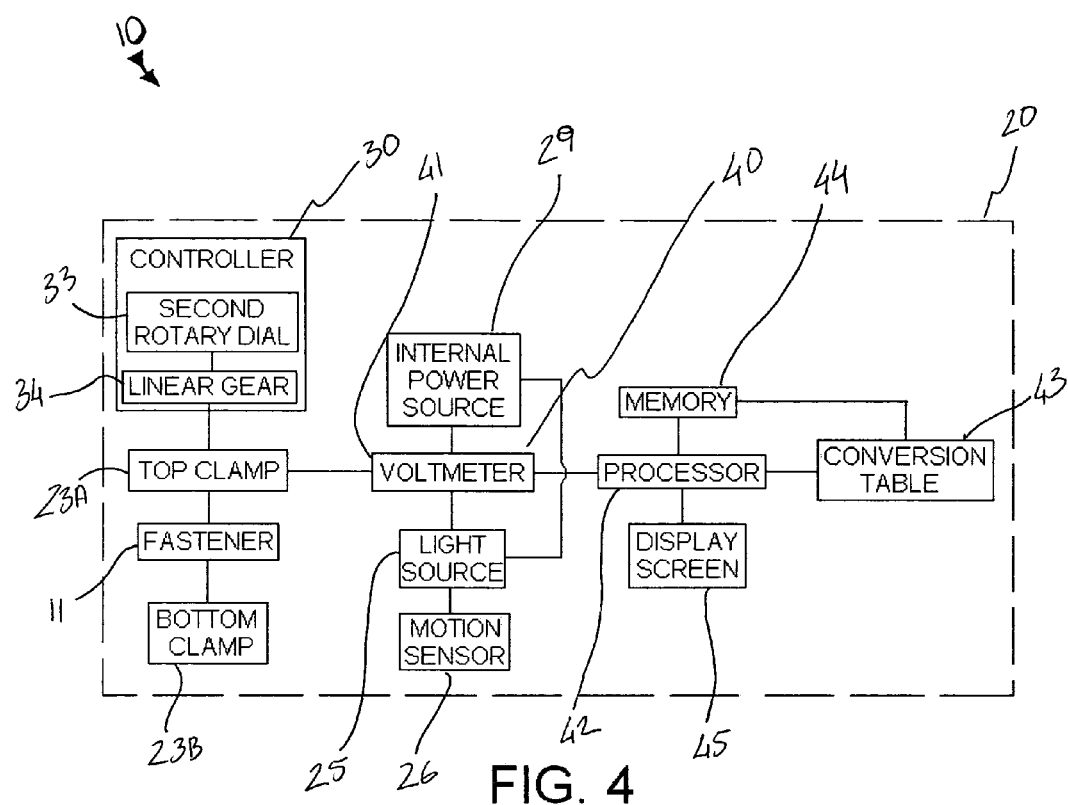
FIG. 4 is a schematic block diagram of the device shown in FIG. 3.

Referring to FIGS. 3 and 4, a mechanism 40 is included for measuring a voltage level when the top 23A and bottom 23B clamps contact the fastener 11. Such a voltage level is proportionally adjusted based upon the size of the fastener 11, which is vital such that the voltage level effectively increases when a linear distance between the top 23A and bottom 23B clamps increases. The voltage level measuring mechanism 40 includes a voltmeter 41 for measuring the voltage level between the top 23A and bottom 23B conductive clamps. Such a voltmeter 41 is electrically coupled directly, without the use of intervening elements, to the top clamp 23A.

Referring to FIG. 4, the voltage level measuring mechanism 40 further includes a processor 42. A conversion table 43 is electrically coupled to the processor 42. Such a conversion table 43 has data stored therein that provides a list of voltage level readings and a corresponding list of fastener sizes associated with the voltage level readings respectively. A memory 44 is electrically coupled directly, without the use of intervening elements, to the processor 42 and the conversion table 43. Such a memory 44 includes software instructions that execute a logic algorithm that is important for causing the hand-held electronic device 10 to measure the size of the fastener 11.

Referring to FIGS. 1, 3 and 4, the software instructions include and execute the steps of linearly ramping a first output voltage when a first input voltage is constant, applying a reference voltage to an integrator (not shown) for a fixed time to ramp up an output voltage of the integrator, and applying an unknown voltage input to the integrator such that the integrator output voltage is caused to ramp back down. Further steps include recording a time period it takes to ramp down the integrator output voltage to zero, and calculating the voltage level by multiplying the reference voltage and the fixed ramp-up time divided by the ramp-down time. The voltage level measuring mechanism 40 also includes a display screen 45 that is located on the front face 21. Such a display screen 45 provides a clear digital reading of a size of the fastener 11, which is crucial and advantageous for allowing a user to quickly and easily determine the size of wrench that they need to manipulate the fastener.

Referring to FIGS. 1, 2, 3 and 4, the device 10 further includes a light source 25 that is disposed along the side face 22. Such a light source 25 is operably coupled directly to the linear gear 34. A motion sensor 26 is electrically coupled to the light source 25 and the linear gear 34. An internal power source 29 is electrically coupled to the light source 25 and the motion sensor 26 respectively. Power is effectively supplied to the light source 25 when the motion sensor 26 detects movement of the linear gear 34, which is vital such that the fastener 11 is conveniently illuminated during operating conditions. This feature is particularly advantageous in situations where the fastener 11 is located in a hard to reach, or obscured area. The housing 20 also has a clip 27 directly attached, without the use of intervening elements, to a rear face 28 thereof that is important for conveniently and effectively allowing a user to attach the device 10 to their belt or any other suitable surface.

The logic algorithm of the present invention may be executed by employing an integrator (not shown) such as an operational amplifier that is defined as a direct circuit-coupled electronic differential voltage amplifier, of high gain, with one inverting and one non-inverting input. A single output voltage is the difference between the inverting and non-inverting inputs multiplied by the open-loop gain. A ramp-compare, analog-to-digital converter (ADC), (also called integrating, dual-slope or multi-slope ADC) is also employed (not shown) for producing a saw-tooth signal that ramps up, then quickly falls to zero. When the ramp starts, a timer starts counting. When the ramp voltage matches the input, a comparator fires, and the timer's value is recorded. As well-known to one skilled in the art, the ramp time is sensitive to temperature because the circuit generating the ramp is often just some simple oscillator. The temperature shortcoming is overcome by employing a clocked counter driving a digital-to-analog converter (DAC), and then using a comparator to preserve the counter's value, or calibrate the timed ramp. A special advantage of the ramp-compare system is that comparing a second signal just requires another comparator, and another register to store the voltage value.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hand-held electronic device for measuring a size of a conductive fastener, said hand-held electronic device comprising:

a portable housing having planar front and side faces, said side face having a linear shape provided with a longitudinal length smaller than a diameter of said front face;

top and bottom conductive clamps directly coupled to said side face and spaced from said front face respectively, said bottom clamp being stationary and said top clamp being linearly displaced along said side face such that the fastener is intercalated between said top and bottom clamps during measuring operations, said top and bottom clamps forming a closed electrical circuit when engaged with the fastener;

a controller operably coupled to said top clamp in such a manner that said top clamp is linearly displaced downwardly and upwardly when said controller is rotated along first and second directions respectively; and means for measuring a voltage level when said top and bottom clamps contact said fastener, said voltage level being proportionally adjusted based upon the size of said fastener such that said voltage level increases when a linear distance between said top and bottom clamps increases;

wherein said voltage level measuring means further comprises a processor;

a conversion table electrically coupled to said processor, said conversion table having data stored therein that provides a list of voltage level readings and a corresponding list of fastener sizes associated with said voltage level readings respectively; and a memory electrically coupled directly to said processor and said conversion table, said memory including software instructions that execute a logic algorithm for causing said hand-held electronic device to measure the size of the fastener, wherein said software instructions comprise and execute the steps of a. linearly ramping a first output voltage when a first input voltage is constant;

b. applying a reference voltage to an integrator for a fixed time to ramp up an output voltage of said integrator;

c. applying an unknown voltage input to said integrator such that said integrator output voltage is caused to ramp back down;

d. recording a time period it takes to ramp down said integrator output voltage to zero; and e. calculating said voltage level by multiplying said reference voltage and said fixed ramp-up time divided by said ramp-down time.

2. The device of claim 1, wherein said voltage level measuring means comprises:

a voltmeter for measuring said voltage level between said top and bottom conductive clamps, said voltmeter being electrically coupled directly to said top clamp.

3. The device of claim 1, wherein said voltage level measuring means further comprises: a display screen located on said front face, said display screen providing a digital reading of a size of the fastener.

4. The device of claim 1, wherein said controller comprises:

a first rotary dial partially exposed exterior of said front face, said first rotary dial having a linear driven shaft coupled directly thereto and extending parallel to a fulcrum axis of said first rotary dial;

a second rotary dial directly coupled to said driven shaft in such a manner that said second rotary dial rotates along a predetermined path when said first rotary dial is rotated along a corresponding direction; and an elongated and linear gear having an outer surface directly attached to said second rotary dial, said linear gear further having a top surface directly coupled to said top clamp such that said top clamp is linearly displaced along said side face when said second rotary dial is articulated.

5. The device of claim 1, further comprising:

a light source disposed along said side face, said light source being operably coupled directly to said linear gear;

a motion sensor electrically coupled to said light source and said linear gear; and an internal power source electrically coupled to said light source and said motion sensor respectively;

wherein power is supplied to said light source when said motion sensor detects movement of said linear gear such that the fastener is illuminated during operating conditions.

6. A hand-held electronic device for measuring a size of a conductive fastener, said hand-held electronic device comprising:

a portable housing having planar front and side faces, said side face having a linear shape provided with a longitudinal length smaller than a diameter of said front face;

top and bottom conductive clamps directly coupled to said side face and spaced from said front face respectively, wherein said top and bottom clamps are coextensively shaped, said bottom clamp being stationary and said top clamp being linearly displaced along said side face such that the fastener is intercalated between said top and bottom clamps during measuring operations, said top and bottom clamps forming a closed electrical circuit when engaged with the fastener;

a controller operably coupled to said top clamp in such a manner that said top clamp is linearly displaced downwardly and upwardly when said controller is rotated along first and second directions respectively; and means for measuring a voltage level when said top and bottom clamps contact said fastener, said voltage level being proportionally adjusted based upon the size of said fastener such that said voltage level increases when a linear distance between said top and bottom clamps increases;

wherein said controller comprises a first rotary dial partially exposed exterior of said front face, said first rotary dial having a linear driven shaft coupled directly thereto and extending parallel to a fulcrum axis of said first rotary dial;

a second rotary dial directly coupled to said driven shaft in such a manner that said second rotary dial rotates along a predetermined path when said first rotary dial is rotated along a corresponding direction; and an elongated and linear gear having an outer surface directly attached to said second rotary dial, said linear gear further having a top surface directly coupled to said top clamp such that said top clamp is linearly displaced along said side face when said second rotary dial is articulated.

7. The device of claim 6, wherein said voltage level measuring means comprises:

a voltmeter for measuring said voltage level between said top and bottom conductive clamps, said voltmeter being electrically coupled directly to said top clamp.

8. The device of claim 6, wherein said voltage level measuring means further comprises:

a processor;

a conversion table electrically coupled to said processor, said conversion table having data stored therein that provides a list of voltage level readings and a corresponding list of fastener sizes associated with said voltage level readings respectively; and a memory electrically coupled directly to said processor and said conversion table, said memory including software instructions that execute a logic algorithm for causing said hand-held electronic device to measure the size of the fastener, wherein said software instructions comprise and execute the steps of
  a. linearly ramping a first output voltage when a first input voltage is constant;
  b. applying a reference voltage to an integrator for a fixed time to ramp up an output voltage of said integrator;
  c. applying an unknown voltage input to said integrator such that said integrator output voltage is caused to ramp back down;
  d. recording a time period it takes to ramp down said integrator output voltage to zero; and
  e. calculating said voltage level by multiplying said reference voltage and said fixed ramp-up time divided by said ramp-down time.

9. The device of claim 6, wherein said voltage level measuring means further comprises: a display screen located on said front face, said display screen providing a digital reading of a size of the fastener.

10. The device of claim 6, further comprising:
  a light source disposed along said side face, said light source being operably coupled directly to said linear gear;
  a motion sensor electrically coupled to said light source and said linear gear; and
  an internal power source electrically coupled to said light source and said motion sensor respectively;
  wherein power is supplied to said light source when said motion sensor detects movement of said linear gear such that the fastener is illuminated during operating conditions.

11. A hand-held electronic device for measuring a size of a conductive fastener, said hand-held electronic device comprising:
  a portable housing having planar front and side faces, said side face having a linear shape provided with a longitudinal length smaller than a diameter of said front face;
  top and bottom conductive clamps directly coupled to said side face and spaced from said front face respectively, wherein said top and bottom clamps are coextensively shaped, said bottom clamp being stationary and said top clamp being linearly displaced along said side face such that the fastener is intercalated between said top and bottom clamps during measuring operations, wherein said bottom clamp is statically disposed at a bottom end of said side face, said top and bottom clamps forming a closed electrical circuit when engaged with the fastener;
  a controller operably coupled to said top clamp in such a manner that said top clamp is linearly displaced downwardly and upwardly when said controller is rotated along first and second directions respectively; and
  means for measuring a voltage level when said top and bottom clamps contact said fastener, said voltage level being proportionally adjusted based upon the size of said fastener such that said voltage level increases when a linear distance between said top and bottom clamps increases;

wherein said controller comprises
  a first rotary dial partially exposed exterior of said front face, said first rotary dial having a linear driven shaft coupled directly thereto and extending parallel to a fulcrum axis of said first rotary dial;
  a second rotary dial directly coupled to said driven shaft in such a manner that said second rotary dial rotates along a predetermined path when said first rotary dial is rotated along a corresponding direction; and
  an elongated and linear gear having an outer surface directly attached to said second rotary dial, said linear gear further having a top surface directly coupled to said top clamp such that said top clamp is linearly displaced along said side face when said second rotary dial is articulated.

12. The device of claim 11, wherein said voltage level measuring means comprises:
  a voltmeter for measuring said voltage level between said top and bottom conductive clamps, said voltmeter being electrically coupled directly to said top clamp.

13. The device of claim 11, wherein said voltage level measuring means further comprises:
  a processor;
  a conversion table electrically coupled to said processor, said conversion table having data stored therein that provides a list of voltage level readings and a corresponding list of fastener sizes associated with said voltage level readings respectively; and
  a memory electrically coupled directly to said processor and said conversion table, said memory including software instructions that execute a logic algorithm for causing said hand-held electronic device to measure the size of the fastener, wherein said software instructions comprise and execute the steps of
    a. linearly ramping a first output voltage when a first input voltage is constant;
    b. applying a reference voltage to an integrator for a fixed time to ramp up an output voltage of said integrator;
    c. applying an unknown voltage input to said integrator such that said integrator output voltage is caused to ramp back down;
    d. recording a time period it takes to ramp down said integrator output voltage to zero; and
    e. calculating said voltage level by multiplying said reference voltage and said fixed ramp-up time divided by said ramp-down time.

14. The device of claim 11, wherein said voltage level measuring means further comprises: a display screen located on said front face, said display screen providing a digital reading of a size of the fastener.

15. The device of claim 11, further comprising:
  a light source disposed along said side face, said light source being operably coupled directly to said linear gear;
  a motion sensor electrically coupled to said light source and said linear gear; and
  an internal power source electrically coupled to said light source and said motion sensor respectively;
  wherein power is supplied to said light source when said motion sensor detects movement of said linear gear such that the fastener is illuminated during operating conditions.

* * * * *